(12) United States Patent
Yliaho

(10) Patent No.: US 9,948,770 B2
(45) Date of Patent: Apr. 17, 2018

(54) PROVIDING SENDER IDENTIFICATION INFORMATION

(71) Applicant: MICROSOFT TECHNOLOGY LICENSING, LLC, Redmond, WA (US)

(72) Inventor: Marko Yliaho, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 14/508,497

(22) Filed: Oct. 7, 2014

(65) Prior Publication Data
US 2016/0100051 A1    Apr. 7, 2016

(51) Int. Cl.
| | |
|---|---|
| *H04M 3/42* | (2006.01) |
| *H04W 8/22* | (2009.01) |
| *G06F 21/32* | (2013.01) |
| *H04M 1/57* | (2006.01) |
| *H04M 1/725* | (2006.01) |
| *G06F 21/62* | (2013.01) |

(52) U.S. Cl.
CPC ........ *H04M 3/42042* (2013.01); *G06F 21/32* (2013.01); *G06F 21/6254* (2013.01); *H04M 1/57* (2013.01); *H04M 1/72527* (2013.01); *H04W 8/22* (2013.01); *H04M 1/576* (2013.01); *H04M 2250/12* (2013.01); *H04M 2250/22* (2013.01); *H04M 2250/52* (2013.01)

(58) Field of Classification Search
CPC ......... H04M 3/42042; H04M 1/72527; H04M 1/57; H04M 2250/22; H04M 1/576; H04M 2250/52; H04M 2250/12; G06F 21/32; H04W 8/22

USPC .......................................... 455/415; 370/338
See application file for complete search history.

(56) References Cited

U.S. PATENT DOCUMENTS

| | | | |
|---|---|---|---|
| 8,311,511 B2 | 11/2012 | Kraft et al. | |
| 2005/0035955 A1 | 2/2005 | Carter et al. | |
| 2006/0242434 A1 | 10/2006 | Lee | |

(Continued)

FOREIGN PATENT DOCUMENTS

| | | |
|---|---|---|
| EP | 2288123 A2 | 2/2011 |
| EP | 2487967 A2 | 8/2012 |

(Continued)

OTHER PUBLICATIONS

"No Show Privacy Hide Caller ID", Published on: Mar. 17, 2014, Available at: https://play.google.com/store/apps/details?id=com.rabbimobile.no_show&hl=en.

(Continued)

*Primary Examiner* — Marcos Batista

(57) ABSTRACT

An apparatus for providing sender identification information of the communication event on a display is described. In an embodiment the apparatus receives a communication event, for example, a call or a message. The mobile apparatus is caused to output a temporary indication of the communication event and the sender identification information relating to the communication event is not shown on the display. When a user of the mobile apparatus is detected with at least one sensor, the display is arranged to display the sender identification information on the display replacing the temporary indication in response to detecting the user with the at least one sensor.

20 Claims, 12 Drawing Sheets

(56) References Cited

U.S. PATENT DOCUMENTS

| | | | |
|---|---|---|---|
| 2010/0151916 A1 | 6/2010 | Baek et al. | |
| 2010/0205667 A1 | 8/2010 | Anderson et al. | |
| 2012/0149439 A1 | 6/2012 | Nakae | |
| 2013/0237288 A1* | 9/2013 | Lee | G06F 3/041 455/566 |
| 2013/0285922 A1 | 10/2013 | Alberth et al. | |
| 2013/0342672 A1* | 12/2013 | Gray | G06F 3/013 348/78 |
| 2014/0168135 A1 | 6/2014 | Saukko et al. | |
| 2014/0194159 A1* | 7/2014 | Karakaya | H04M 19/04 455/556.1 |
| 2015/0049033 A1* | 2/2015 | Kim | G06F 3/041 345/173 |
| 2015/0281580 A1* | 10/2015 | Karpenko | H04N 5/23264 348/208.2 |
| 2016/0337595 A1* | 11/2016 | Kim | G06F 1/1677 |

FOREIGN PATENT DOCUMENTS

| | | |
|---|---|---|
| EP | 2574026 A1 | 3/2013 |
| EP | 2685704 A1 | 1/2014 |
| WO | 2013148596 A2 | 10/2013 |

OTHER PUBLICATIONS

Wimmer, et al., "HandSense—Discriminating Different Ways of Grasping and Holding a Tangible User Interface", In Proceedings of the Third International Conference on Tangible and Embedded Interaction, Feb. 16, 2009, 4 pages.

"Simple Incoming Privacy", Jul. 15, 2014, Available at: http://www.appszoom.com/android_applications/tools/simple-incoming-privacy_cyldl.html.

"Hide a Caller App", Published on: Nov. 26, 2008, Available at: http://7thspace.com/app-store/app-details/470255/hide_a_caller.html.

Smith, Mat, "NTT DoCoMo Grip UI detects how you hold your device, makes big phones friendly for tiny hands (video)", Jul. 17, 2014, Available at: http://www.engadget.com/2012/10/01/ntt-docomo-grip-ui-ceatec-2012/.

"International Search Report and Written Opinion Issued in PCT Application No. PCT/US2015/052771", dated Apr. 8, 2016, 20 Pages.

"International Preliminary Report on Patentability Issued in PCT Application No. PCT/US2015/052771", dated Feb. 1, 2017, 10 Pages.

"Second Written Opinion Issued in PCT Application No. PCT/US2015/052771", dated Dec. 6, 2016, 10 Pages.

\* cited by examiner

PROVIDING SENDER IDENTIFICATION INFORMATION

BACKGROUND

Apparatuses, for example, mobile apparatuses are often capable of performing various forms of communication, for example, initiate and receive voice calls and send and receives various messages. A voice call or a message has a caller/sender and a receiver. In voice calls, for example, via a cellular network, caller identity information is usually transmitted and the receiver of a call is able to know who is calling. Sometimes it is also possible for the caller to hide his identity, and no caller information is provided by the network to the receiver. Similarly, when messages, for example, short messages or emails are sent between a sender and a receiver, in addition to the actual content of the message, the receiver also receives information identifying the sender.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A mobile apparatus comprises a display, at least one sensor, at least one processor and at least one memory storing program instructions. The apparatus receives a communication event, for example, a call or a message. The mobile apparatus outputs a temporary indication of the communication event on the display. The true sender information of the communication event is not shown on the display and a temporary indication of the communication event is provided instead. When a user of the mobile apparatus is detected with the at least one sensor, the display is arranged to display the sender identification information on the display replacing the temporary indication.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples may be described and illustrated herein as being implemented in a smartphone or a mobile phone, these are only examples of a mobile apparatus and not a limitation. As those skilled in the art will appreciate, the present examples are suitable for application in a variety of different types of mobile apparatuses, for example, in tablets etc.

Figure 1:
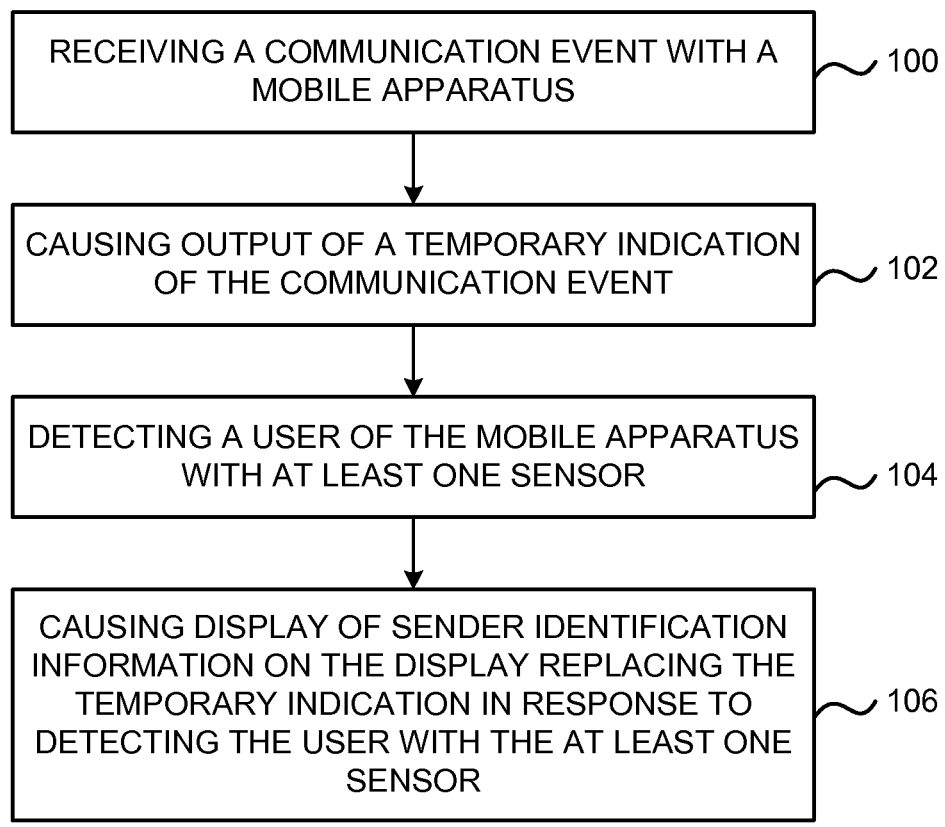
FIG. 1 is a flow diagram of a method.

FIG. 1 is a flow diagram of a method. At 100 a communication event is received with a mobile apparatus. The communication event refers, for example, to a phone call, multimedia call, a voice over Internet Protocol (VoIP) call, a multimedia message, a text message, an instant message, or to any other message. At 102 a temporary indication of the communication event is caused to be output. The temporary indication is provided instead of or in place of sender identification information relating to the communication event on the display. For example, in case of a phone call, the sender identification information comprises a telephone number of the calling party. At 104 a user of the mobile apparatus is detected with at least one sensor. The user may be detected, for example, with a display of the mobile apparatus that is touch-sensitive or with one or more other sensors arranged into the mobile apparatus. At 106 the sender identification information replacing the temporary indication is caused to be displayed on the display in response to detecting the user with the at least one sensor. For example, when a user of a mobile apparatus, for example, a smartphone, receives a phone call, and the smartphone is on a table, the caller identity is not shown. Instead, a temporary indication is provided, for example, "incoming call" on the display. Only when the user picks the smartphone and it is detected that the smartphone is held in a hand, the caller identity replacing the temporary indication is caused to be displayed on the display. Instead of providing the temporary identification on the display, it may also additionally or alternatively be provided by other output means, for example, lights, sounds or a haptic indication.

Figure 2A:
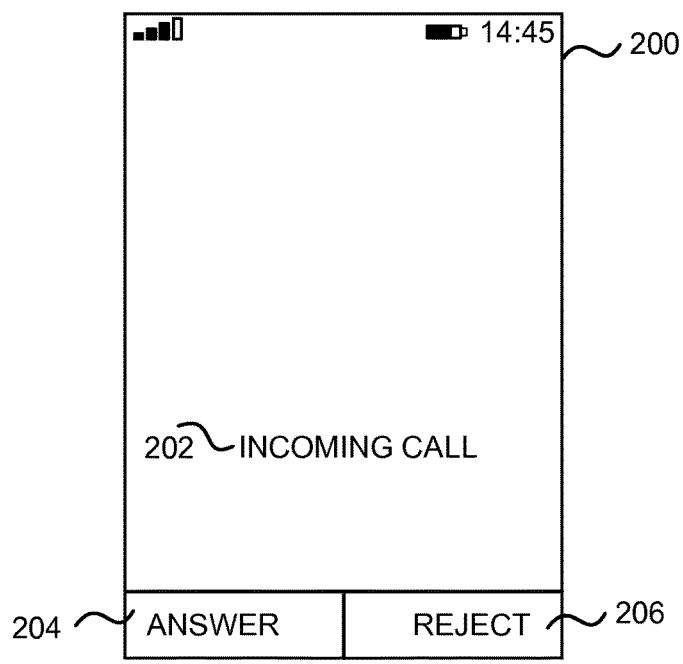
FIGS. 2A, 2B, 2C, 2D and 2E illustrate example views on a display of a mobile apparatus receiving a communication event.

FIGS. 2A, 2B, 2C, 2D and 2E illustrate example views on a display of a mobile apparatus receiving a communication event. FIG. 2A illustrates a view 200 of a display of a mobile apparatus, for example, a mobile phone when receiving a communication event. In this example, the communication event refers to an incoming call 202. Selection buttons 204, 206 are provided only for illustration purposes that a user of the mobile phone is able to answer or reject the incoming call. When the mobile phone receives the incoming call, it receives also information identifying the caller from call signaling. The mobile phone, however, does not show the true identity of the caller on the display but displays only a temporary indication about the call. The temporary indication in this example is the text "incoming call" 202 displayed on the display.

Figure 2B:
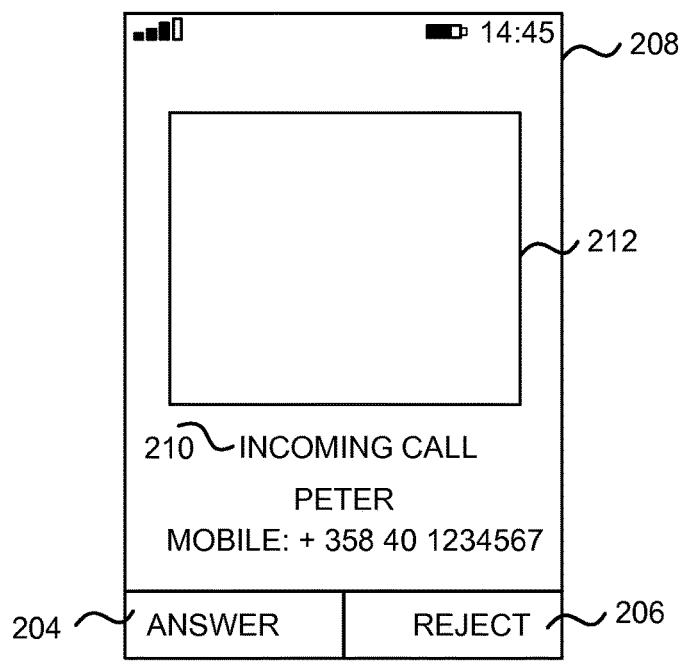

When the user of the mobile phone becomes aware of the incoming call, in a normal situation, the user locates the phone and picks the mobile phone. FIG. 2B illustrates a view 208 on the display of the mobile phone as a result of picking the mobile phone. The mobile phone may detect with at least one sensor that the user holds the phone in his/her hand and that the mobile is no longer, for example, on a table or in a pocket. In response to the detection, the view 208 is displayed on the display. The display now displays the sender identification information 210 replacing the temporary indication. In this example, the sender identification information 210 comprises a name of the caller and the phone number of the caller. Additionally, if the user of the mobile phone has stored an image in connection with this caller to a phonebook, the image 212 may be displayed on the display.

If the incoming call originates from an unknown number which is not stored in a phone book in the mobile phone, the mobile phone may first display a temporary indication (for example, "incoming call" as indicated in FIG. 2B), When it is detected that the user holds the phone in his hand, the number of the caller may be shown (for example, "incoming call, mobile +358 40 7654321).

Figure 2C:
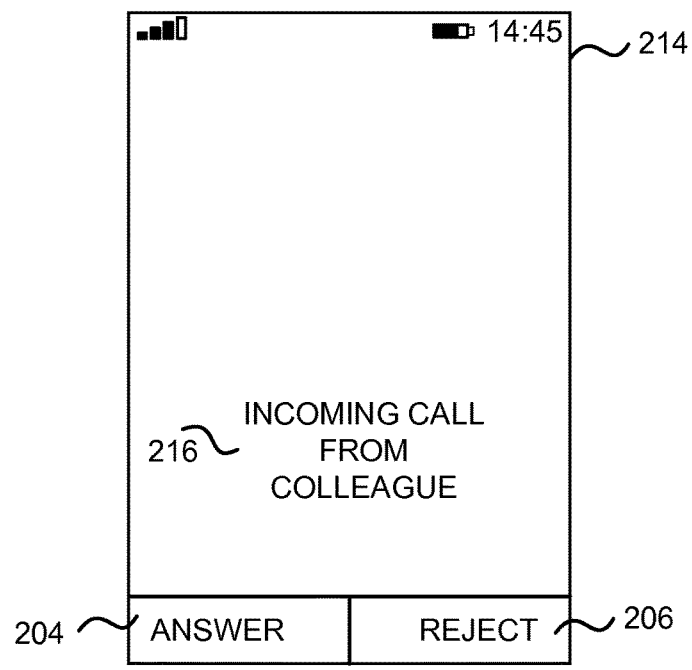

FIG. 2C illustrates another possible view 214 of a display of a mobile apparatus, for example, a mobile phone when receiving a communication event, for example, a call. In FIG. 2A a user of the mobile phone was provided only with information "incoming call" when receiving the call. In the example illustrated in FIG. 2C, the user is provided with some further information about the caller. The user may have previously configured certain entries in a phone book of the mobile phone in one or more subgroups. In the example illustrated in FIG. 2C, the caller was previously allocated to a subgroup "colleague". Thus, when the mobile phone receives a call from Peter as illustrated in FIG. 2B, the user is shown a temporary indicator "incoming call from colleague" instead of the true identity of the caller. With the solution disclosed in the example of FIG. 2C, the user is shown some level of caller information ("colleague") but still the true identity of the caller remains hidden until the user perform an additional action.

Figure 2D:
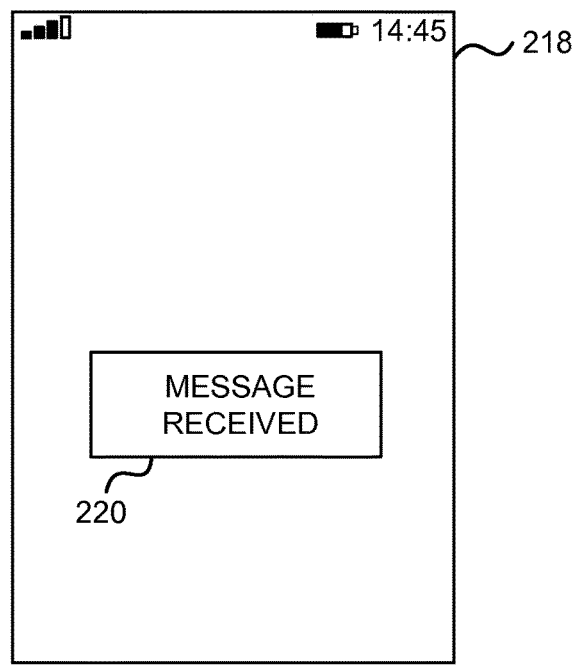

FIG. 2D illustrates a view 214 on the display of the mobile phone when a message is received. The message may be a text message, a multimedia message, an instant message or any other communication related message. When the mobile phone receives the message, it receives also information identifying a sender of the message. The mobile phone, however, does not show the true identity of the sender or content of the message on the display but displays only a temporary indication about the message. The temporary indication in this example is the text "message received" 220 displayed on the display. In one example, the mobile phone may show a part of the received message or the whole message but not the message sender identification information.

Figure 2E:
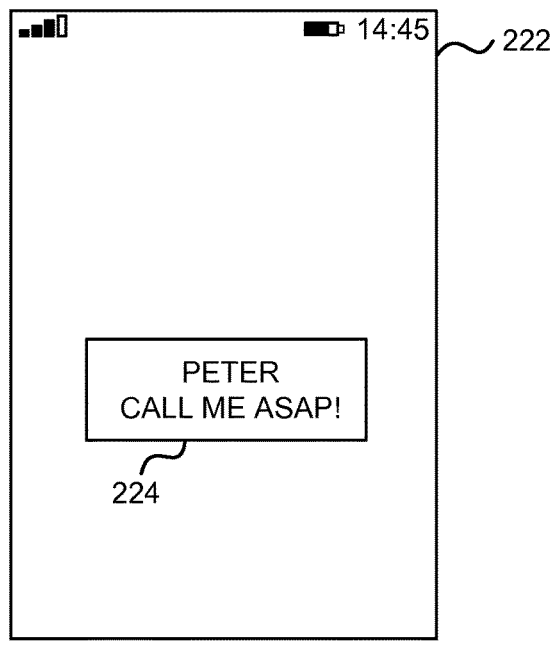

When the user of the mobile phone becomes aware of the message, in a normal situation, the user locates the phone and picks it. FIG. 2E illustrates a view 222 on the display of the mobile phone as a result of picking the mobile phone. The mobile phone may detect with at least one sensor that the user holds the phone in his/her hand and that the mobile phone is no longer, for example, on a table or in a pocket. In response to the detection, the view 222 is displayed on the display. The display now displays the message sender identification information 224 replacing the temporary indication. In this example, the sender identification information 210 comprises a name of the sender. The mobile phone may simultaneously show also a part of the received message or the whole message, as illustrated in FIG. 2E.

The solution illustrated in FIGS. 2A, 2B, 2C, 2D and 2E provides improved usability and user interface because the true sender identification information relating to a communication event is not displayed until the user picks the mobile apparatus or until the mobile apparatus detects the user. For example, when the user is in a meeting and his mobile phone is on a table next to him, the persons sitting next to the user are not able to see the true caller/sender identification information since the true caller/sender identification information is not shown on the display until the user holds his mobile phone in his hand. By applying the temporary indication to messages, it is possible to prevent displaying message sender information and/or message content inadvertently.

In one further example of FIG. 2A, 2B, 2C, 2D or 2E, the displaying of the sender identification information on the display after detecting that the mobile apparatus is held in a hand is delayed by a predetermined period, for example, a second or two. This provides further assurance to the user that he/she is able to grab the mobile phone and keep it in a desired position in his/her hand to minimize the possibility that a non-desired person sees the sender identification information.

The examples of FIGS. 2A, 2B, 2C, 2D and 2E illustrate that the mobile phone detects with at least one sensor that the user holds the phone in his/her. In other possible example embodiments, it may be possible to detect the user without the user touching or grabbing the mobile phone. These example embodiments will be discussed later in the following description, and it is evident that these alternative user detection implementations may be used also in the examples of FIGS. 2A, 2B, 2C, 2D and 2E where the mobile phone receives a communication event.

Figure 3:
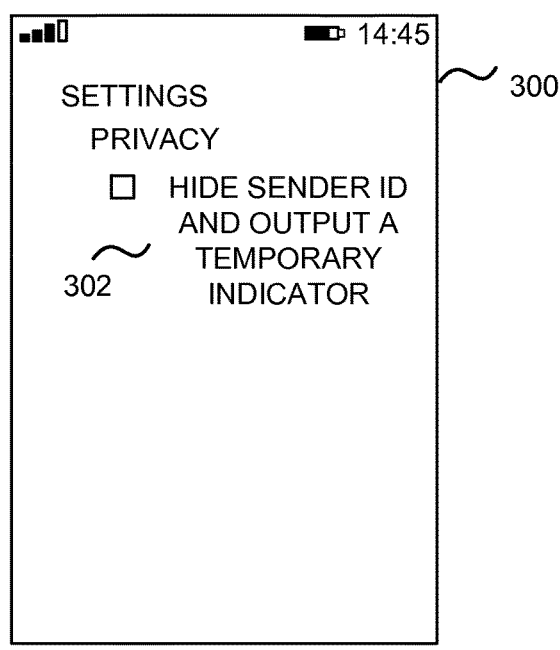
FIG. 3 is a view illustrating setting of an operation mode with a mobile apparatus.

FIG. 3 is a view 300 for setting an operation mode with a mobile apparatus used in one or more of the examples of FIG. 2A, 2B, 2C, 2D or 2E. A user may be able to select from a privacy menu option 302 that sender identification information may be hidden and that a temporary indication is output instead first. It may also be possible to select when to apply the selected privacy menu option. In one example, the privacy menu option 302 may be applied to all calls or messages received by the mobile apparatus. In another example, the user may be able to choose those phone numbers or senders for which the caller identification information or message sender identification information is to be hidden. The settings view 300 may also provide other setting options. For example, a user may be able to form one or more subgroups and allocate one or more entries from a phone book to these subgroups. For example, as already discussed above, the user may allocate all his colleagues to a subgroup "colleague". When a communication event is received and the sender/caller of the communication event belongs to a subgroup, a subgroup identifier or subgroup name may be displayed instead of the true sender/caller identification information after detecting a user of the mobile apparatus with at least one sensor. Thus, a subgroup may be identified by a group indication "colleague". In another example, some other graphical identifier other than textual identifier may be used as a group indication, for example, a figure, a logo etc.

In another example, additionally or alternatively, a subgroup may be identified with a color. Thus, the color may act as a group indication. For example, "incoming call" or "message received" may be displayed on the display with a color that has been linked to the subgroup to which the caller or message sender belongs to. Further, different colors may be used to distinguish colleagues from family members.

In another example, additionally or alternatively, the temporary indication may comprise a light or a light pattern. Thus, the light or light pattern may act as a group indication. A specific light or light pattern may be linked to a certain caller/message sender or to a subgroup. Thus, when receiving a call or message from this sender or subgroup, the display of the mobile apparatus may remain unchanged (i.e. show no indication about incoming call or message). Instead, a light or light pattern is output with an appropriate apparatus element. When the user is detected with at least one sensor in the mobile apparatus, the caller/message sender identification information is displayed on the display of the mobile apparatus.

In another example, additionally or alternatively, the temporary indication may comprise a sound or a sound pattern, for example, a ringing tone. A specific sound or sound pattern may be linked to a certain caller/message sender or to a subgroup. Thus, when receiving a call or message from this sender or subgroup, the display of the mobile apparatus may remain unchanged (i.e. show no indication about incoming call or message). Instead, a sound or sound pattern is output with an appropriate apparatus element. When the user is detected with at least one sensor in the mobile apparatus, the caller/message sender identification information is displayed on the display of the mobile apparatus.

In another example, additionally or alternatively, the temporary indication may comprise a haptic indication. For example, the mobile apparatus may be configured to output a specific vibration pattern as a temporary indication when receiving a communication event.

The above disclosed temporary indication types alone or in some combination with each other may enable a solution that provides to the user some degree of identification information but at the same hides the true sender identification information.

Although FIGS. 2A, 2B, 2C, 2D, 2E and 3 illustrate examples where the communication event is an incoming call or a text message, they are only examples of possible communication events. The communication event may also be, for example, a multimedia call, a SIP (Session Initiation Protocol) call, a text message, a multimedia message, an email message or any other event or message which involves a specific sender. For example, regarding email messages an incoming email may be displayed on a display of a mobile apparatus as a preview message without launching the actual email application when a new email is received. With the disclosed solution it is possible to provide an implementation that hides sender identification information also for messages, for example, email messages. The mobile apparatus may show on the display only that a new email has been received but does not reveal sender or content information at all. Only when the mobile apparatus is held in a hand, the sender identification information and content information is shown on the display.

Figure 4A:
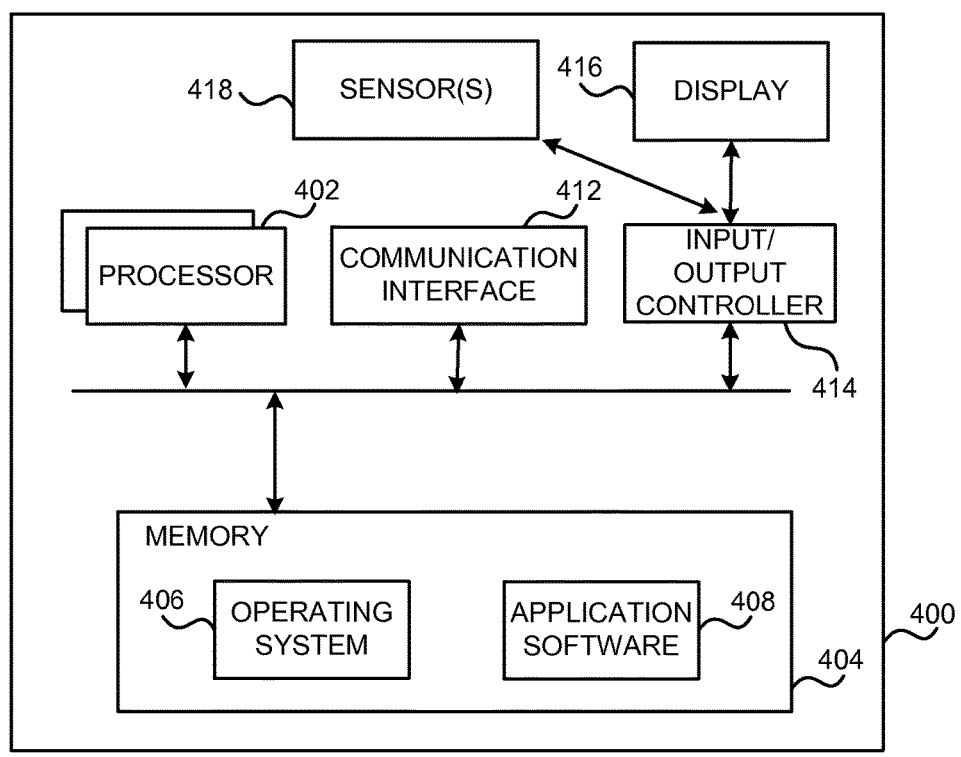
FIG. 4A is a block diagram of one example of a mobile apparatus.

FIG. 4A illustrates various components of an exemplary mobile apparatus 400 which may be implemented as any form of a computing and/or electronic device. The mobile apparatus 400 may be used to implement the views disclosed in any of FIGS. 2A, 2B, 2C, 2D, 2E and 3.

The mobile apparatus 400 comprises one or more processors 402 which may be microprocessors, controllers or any other suitable type of processors for processing computer executable instructions to control the operation of the mobile apparatus 400. Platform software comprising an operating system 406 or any other suitable platform software may be provided at the mobile apparatus to enable application software 408 to be executed on the device.

Computer executable instructions may be provided using any computer-readable media that is accessible by the mobile apparatus 400. Computer-readable media may include, for example, computer storage media such as memory 404 and communications media. Computer storage media, such as memory 404, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 404) is shown within the mobile apparatus 400 it will be appreciated that the storage may be distributed or located remotely and accessed via a network or other communication link (e.g. using communication interface 412).

The mobile apparatus 400 may comprise an input/output controller 414 arranged to output display information to a display device 416 which may be separate from or integral to the mobile apparatus 400. The input/output controller 414 may also be arranged to receive and process input from one or more devices, such as a user input device (e.g. a keyboard, camera, microphone or other sensor). In one example, the display device 416 may also act as the user input device if it is a touch sensitive display device. The input/output controller 414 may also output data to devices other than the display device, e.g. a locally connected printing device.

The input/output controller 414 may be in communication with at least one sensor 416 such as one or more cameras, an inertial measurement unit and/or other sensors. This enables the mobile apparatus 400 to receive data observed by the sensors and to control the sensors. The at least one sensor 416 is used to detect a user of the mobile apparatus.

The input/output controller 414, display device 416 and optionally user input device may comprise natural user interaction (NUI) technology which enables a user to interact with the mobile apparatus in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

The communication interface 412 may be used to receive a communication event. The communication event may be, for example, an incoming call or an incoming message. The communication interface 412 and/or the processor 402 thus serve as means for receiving the communication event. The processor 402 may cause the display device 416 to display a temporary indication instead of or in place of sender identification information relating to the communication event, the processor 402 and/or the display device 416 thus serving as means for outputting a temporary indication of the communication event. The at least one sensor 418 may be arranged in the display device 416 to detect the user or detect that the mobile apparatus 400 is held in a hand, the at least one sensor 418 thus serving as means for detecting a user of the mobile apparatus.

In one example, the display device 416 may be a touch-sensitive display. When a user holds the mobile apparatus 400 in his hand, at least one of the user's fingers may slightly touch the touch-sensitive display. In another example, a touch sensor in the display device 416 may be sensitive enough to detect a finger also on a side or sides of the mobile apparatus 400. After detecting the user or detecting that the mobile apparatus 400 is held in a hand, the processor 402 causes the display device 416 to display sender identification information replacing of the temporary indication. In other words, the processor 402 serves as means for causing display of the sender identification information.

In another example, the user need not hold the mobile apparatus 400 in a hand when the sender identification information is displayed on the display device 416. The mobile apparatus may reside, for example, on a table when the user is being recognized based on the image information provided by the at least one sensor 418. The processor 402 may then cause display of the sender identification information on the display device 416 even if the user is not holding the mobile apparatus 450 in his hand if the at least one sensor 418 is able to detect vicinity of the user or a hand of the user. For example, if the touch sensor in the display device 416 is sensitive enough, it may detect a hand of the user even if the user is not touching the display device 416.

In one example, the processor 402 may be configured to delay causing display of the sender identification information on the display 416 by a predetermined period after detecting that the mobile apparatus 400 is held in a hand. Thus, the processor 402 serves as means for delaying display of the sender identification information on the display 416.

In another example, the mobile apparatus 400 may include an actuator for providing a haptic indication to the user of the mobile apparatus 400. The actuator may be used to provide the temporary indication to the user. The user may set that the haptic indication is a caller/sender or group specific. In one example, when a call is received, a temporary indication "incoming call" may be displayed on the display 416 and also a normal ringing tone may be provided, but the haptic indication may be caller or group specific. Further, in one example the haptic indication type may be context dependent. In other words, if the mobile apparatus 400 is in the pocket, caller specific haptic indication may be given, but if the mobile apparatus 400 is, for example, on a table, a haptic indication common to all callers may be given to ensure that the caller is not identified by other people.

As disclosed above with reference to FIGS. 2A-2E and 3, the temporary indication may refer also to other indications, for example, to a visual indication (for example, a color on the display or a light provided by the mobile apparatus), an audible indication (for example, a sound), a haptic indication, and other user-perceivable indications. Thus, the mobile apparatus 400 may include also other output devices, for example, a lamp or a led, a speaker, or an actuator etc. Further, the temporary indication may be user or group specific.

Figure 4B:
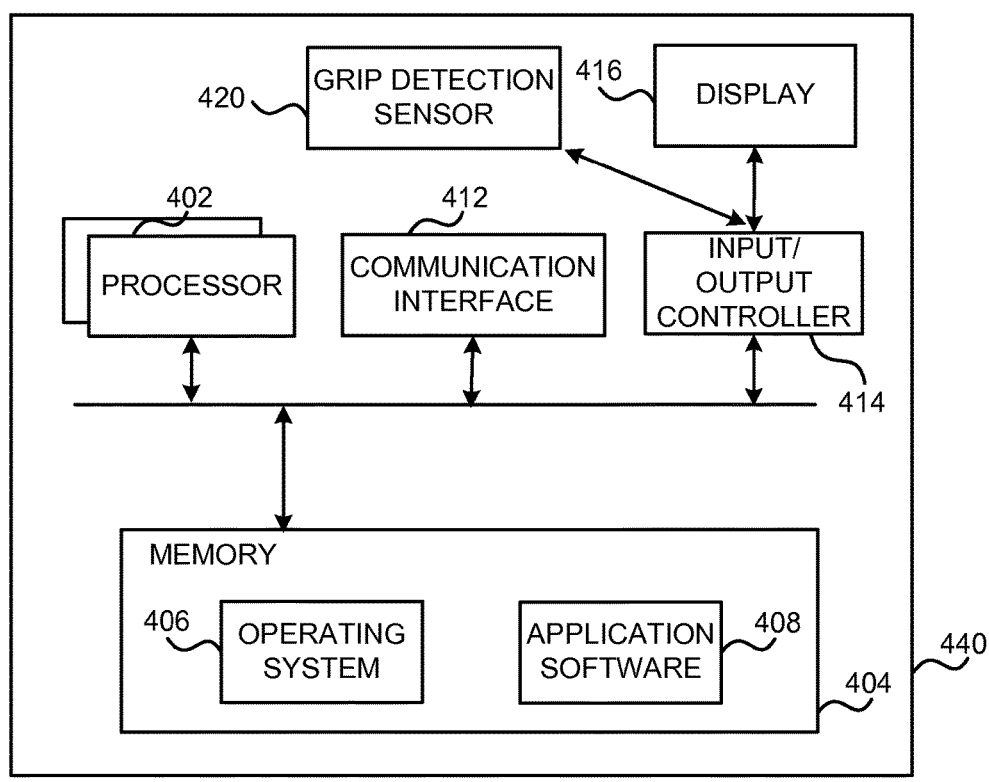
FIG. 4B is a block diagram of another example of a mobile apparatus.

FIG. 4B illustrates various components of an exemplary mobile apparatus 440 which may be implemented as any form of a computing and/or electronic device. The mobile apparatus 440 of FIG. 4B differs from the mobile apparatus of FIG. 4A in that the mobile apparatus 440 uses at least one grip detection sensor 420 to detect that the mobile apparatus 440 is held in a hand. The at least one grip detection sensor 420 may be arranged, for example, in at least one side of the mobile apparatus 440 so that they are able to detect when the user holds the mobile apparatus 440 in his hand. The grip detection sensor 420 may refer to any sensor that is able to detect touch, for example, a pressure sensor.

The processor 402 may receive from the at least grip detection sensor 418 information that the mobile apparatus is held in a hand in at least one predetermined position on the mobile apparatus 440. In one example, the processor 402 then causes the display device 416 to display sender identification information replacing of the temporary indication only after detecting that the mobile apparatus 440 is held in a hand in the at least one predetermined position.

In another example of FIG. 4B, also pressure levels may be sensed in the at least one predetermined position by the grip detection sensor 428 serving as means for sensing a pressure level, and the processor 402 causes the display device 416 to display sender identification information replacing of the temporary indication only after detecting that a predetermined pressure level is exceeded when the mobile apparatus 440 is held in a hand in the at least one predetermined position. Thus the processor 402 may serve as means for causing display of the sender identification information on the display after detecting that a predetermined pressure level is exceeded when the mobile apparatus is held in a hand.

Figure 4C:
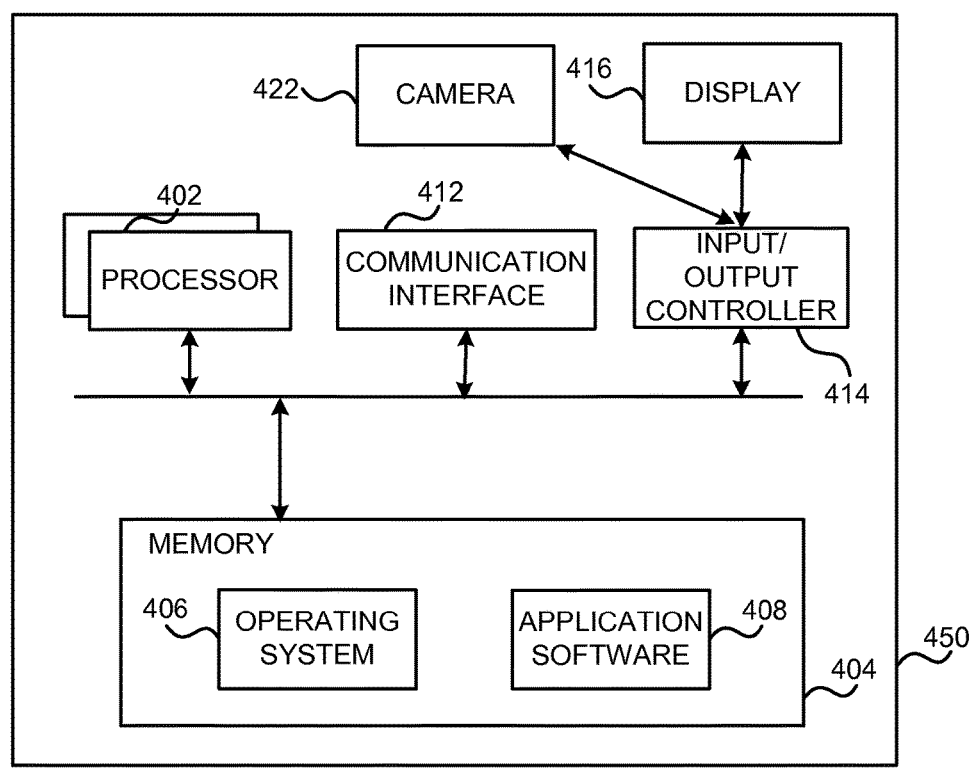
FIG. 4C is a block diagram of another example of a mobile apparatus.

FIG. 4C illustrates various components of an exemplary mobile apparatus 450 which may be implemented as any form of a computing and/or electronic device. The mobile apparatus 450 of FIG. 4C differs from the mobile apparatus of FIG. 4A or FIG. 4B in that the sensor 418 comprises at least one camera 422 that is used to recognize the user holding the mobile apparatus 450. When the mobile apparatus 450 receives the communication event, for example, an incoming call or a message, the processor 402 may activate the camera 420. The processor 402 may process and analyze image information received from the camera 420 to determine whether a predetermined user is holding the mobile apparatus 450 in his hand. The analysis may be based, for example, on facial recognition algorithms. The processor 402 may then cause display of the sender identification information on the display device 416 after recognizing a predetermined user in response to the analysis. The processor 402 may thus serve as means for activating the camera 420, means for analyzing image information from the camera 420 and means for causing display of the sender identification information on the display device 416 after recognizing a predetermined user in response to the analysis.

In another example, the user need not hold the mobile apparatus 450 in a hand when the sender identification information is displayed on the display device 416. The mobile apparatus may reside, for example, on a table when the user is being recognized based on the image information provided by the at least one camera 422. The processor 402 may then cause display of the sender identification information on the display device 416 after recognizing a predetermined user in response to the analysis even if the user is not holding the mobile apparatus 450 in his hand.

In one example of FIG. 4C, the mobile apparatus 450 comprises at least two cameras. The processor 402 is able to determine distance from the mobile apparatus 450 to a user of the mobile apparatus 450 based on image information provided by the at least two cameras. Any known image processing algorithm may be used with which it is possible to determine the distance from the mobile apparatus 450 to a user holding the mobile apparatus 450 or to the face of the user holding the mobile apparatus 450 based on image information from the at least two cameras. When the distance is determined to be less than a threshold value, the processor 402 may then cause display of the sender identification information on the display device 416. The threshold value may be chosen by the user, and it is, for example 40 cm. Thus the processor 402 may serve as means for activating the at least one camera; means for analyzing image information from the at least one camera, and means for causing display of the sender identification information on the display after recognizing, based on image information provided by the at least one camera, that a distance from the mobile apparatus to the user or to the face of the user is less than a predetermined threshold value.

In another example, the user need not hold the mobile apparatus 450 in order to display the sender identification information with the display device 416. The mobile apparatus may reside, for example, on a table when the distance from the mobile apparatus 450 to the user holding the mobile apparatus is determined. The processor 402 may then cause display of the sender identification information on the display device 416 after recognizing a predetermined user in response to the analysis even if the user is not holding the mobile apparatus 450 in his hand.

Figure 4D:
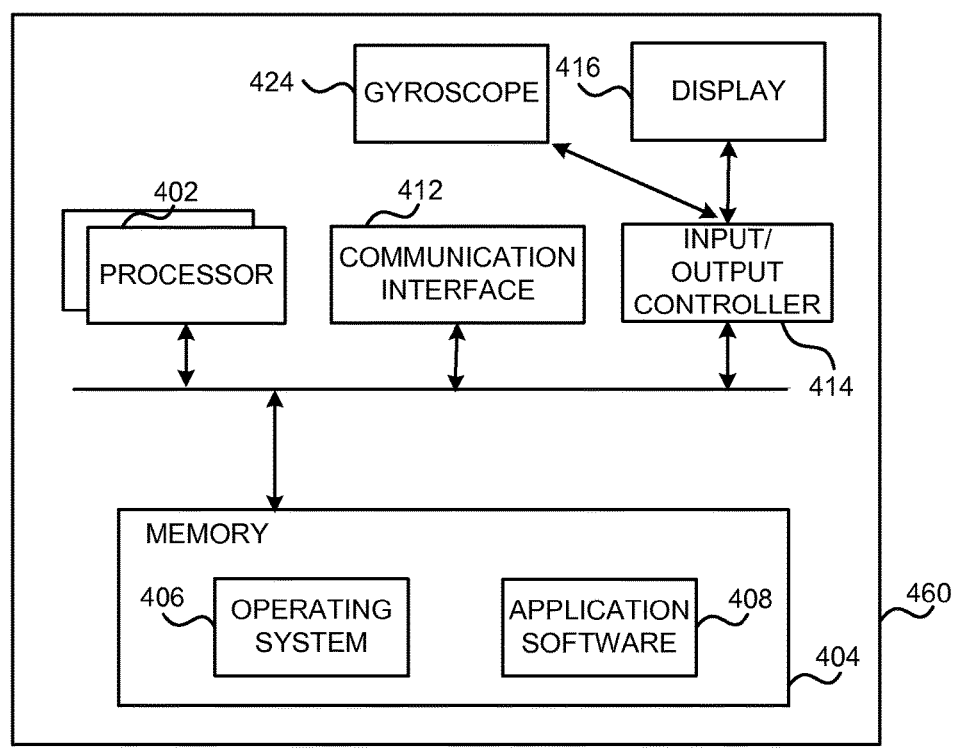
FIG. 4D is a block diagram of another example of a mobile apparatus.

FIG. 4D illustrates various components of an exemplary mobile apparatus 460 which may be implemented as any form of a computing and/or electronic device. The mobile apparatus 460 of FIG. 4D differs from the mobile apparatus of FIG. 4A, 4B or 4C in that the sensor 418 comprises a gyroscope 424. The gyroscope 424 may be used to determine when to display the sender identification information on the display device 416. A gyroscope is a device that is used to measure or maintain orientation, based on the principles of angular momentum. The processor 402 may receive measurement information from the gyroscope 424, and based on the received measurement information, the processor 402 is able to determine that a user of the mobile apparatus 460 has stabilized the mobile apparatus 460, the processor 402 thus serving as means for determining based on information from the gyroscope 424 that the user of the mobile apparatus has stabilized the mobile apparatus. The processor 402 analyzes, for example X-axis information provided by the gyroscope 424, and when the X-axis measurements remain substantially close to zero, the processor 402 is able to deduce that the user holds the mobile device 460 still. This can be interpreted so that the user holds the mobile device 460 in a position in which he is able to order to read information displayed by the display device 416. Therefore, the processor 402 may then cause display of the sender identification information on the display device 416, thus serving as means for causing display of the sender identification information on the display replacing the temporary indication after stabilization.

Figure 4E:
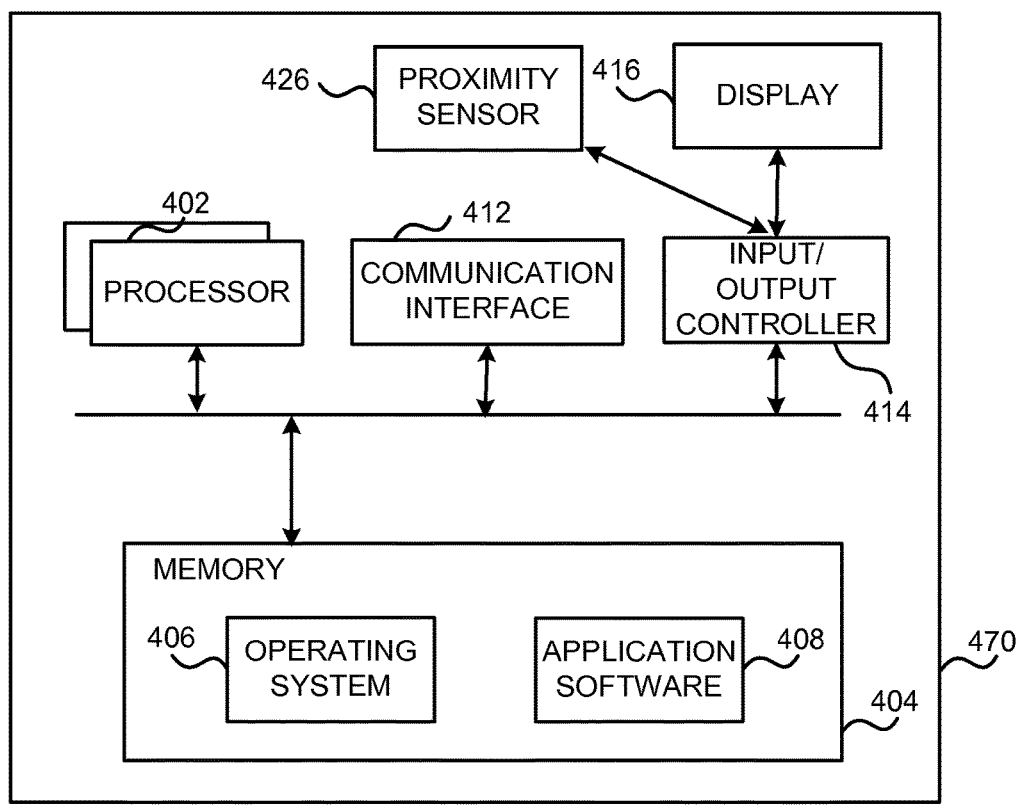
FIG. 4E is a block diagram of another example of a mobile apparatus.

FIG. 4E illustrates various components of an exemplary mobile apparatus 460 which may be implemented as any form of a computing and/or electronic device. The mobile apparatus 470 of FIG. 4E differs from the mobile apparatus of FIG. 4A, 4B, 4C or 4D in that the sensor 418 comprises a proximity sensor 426. A proximity sensor is a sensor that is able to detect the presence of nearby objects without any physical contact. A proximity sensor often emits an electromagnetic field or a beam of electromagnetic radiation (infrared, for instance), and looks for changes in the field or return signal. The processor 402 may receive information from the proximity sensor 426, and based on the received information, the processor 402 is able to determine distance of the mobile apparatus 470 to a user of the mobile apparatus 470 or to a hand of the user. The processor 402 may then cause display of the sender identification information replacing the temporary indication on the display device 416 when the distance is less than a threshold value. The threshold value may be set beforehand and it is, for example, 3 cm. In one example, the user may set the threshold value to a desired distance.

Figure 4F:
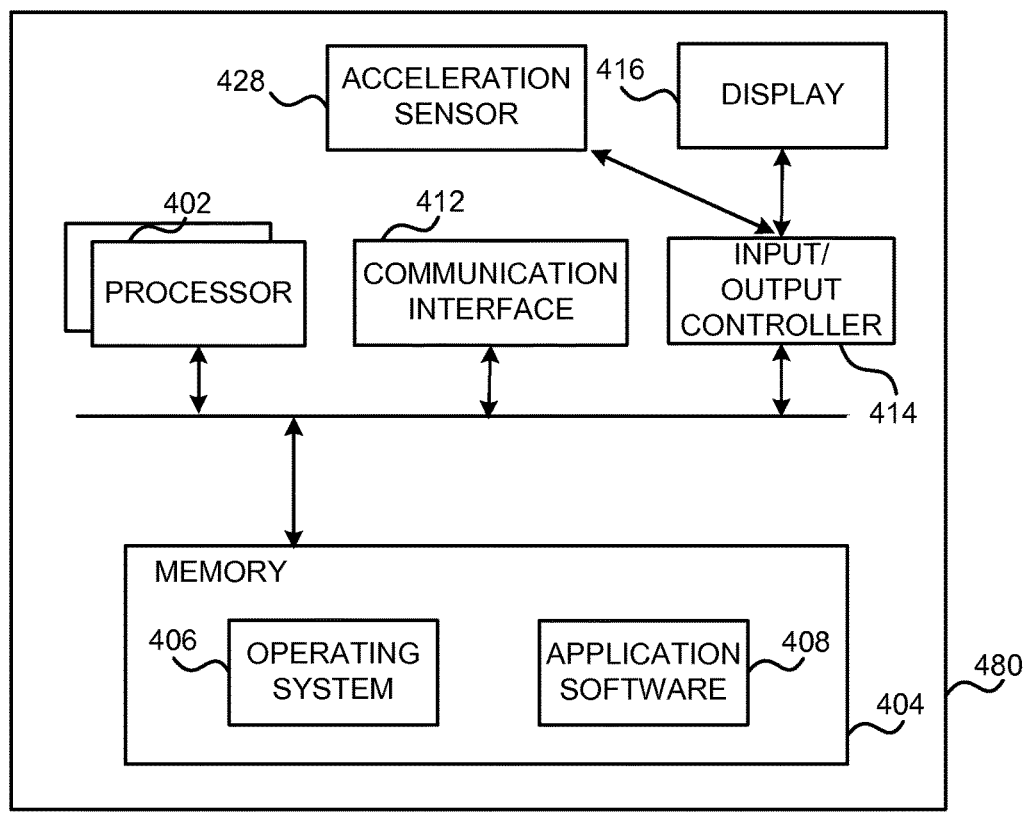
FIG. 4F is a block diagram of another example of a mobile apparatus.

FIG. 4F illustrates various components of an exemplary mobile apparatus 480 which may be implemented as any form of a computing and/or electronic device. The mobile apparatus 480 of FIG. 4F differs from the mobile apparatus of FIG. 4A, 4B, 4C, 4D or 4E in that the mobile apparatus 470 comprises an acceleration sensor 428. The acceleration sensor 428 may be used to determine when to display the sender identification information on the display device 416. The processor 402 may receive measurement information from the acceleration sensor 428, and based on the received measurement information, the processor 402 is able to determine that a user of the mobile apparatus has stabilized the mobile apparatus 480. The processor 402 may then cause display of the sender identification information on the display device 416 after determining that the user of the mobile device has stabilized the mobile apparatus 480. Thus the processor 402 may serve as means for determining based on information from the acceleration sensor that the user of the mobile apparatus has stabilized the mobile apparatus, and means for causing display of the sender identification information on the display replacing the temporary indication after stabilization.

Although FIGS. 4A-4F may describe that an acceleration sensor, a proximity sensor, a gyroscope and a camera are alternative elements for each other, a further example may be provided where a mobile apparatus comprises more than one of these elements.

In at least one example disclosed in FIGS. 4A-4F, the user may lose grip of the mobile apparatus (for example, put the mobile apparatus back on a table) when the sender identification information is displayed on the display. The mobile apparatus may be configured to switch off the display device and let the incoming call "ring" silently and invisibly. In another example, the mobile apparatus may be configured to reject the incoming call. In another example, in case of a received message, the mobile apparatus may be configured to switch off the display device when the user loses grip of the mobile apparatus. In another example, the mobile apparatus may be configured to keep the display device on and let the temporary indication stay on the display. In another example, the mobile apparatus may be configured to keep the display device on and let the caller identification information stay on the display.

In at least one example disclosed in FIGS. 4A-4F, the user may already have the mobile apparatus in his hand when a communication event, for example, a call is received. The user may be reading his email or browsing the internet with his device. In one example, a temporary indication "incoming call" may be displayed, and the displaying of the caller identification information on the display after detecting that the mobile apparatus is held in a hand is delayed by a predetermined period, for example, a second or two. In another example, if the mobile apparatus is already in the user's hand when a communication event occurs, the sender identification information relating to the communication event may not be shown by default, but the user may need to change to mobile apparatus phone to the other hand or put it away and grab it again. Alternatively, the user may be able to select from the user interface of the display "show caller ID" and only then the call identification information is shown.

At least some of the examples disclosed in FIGS. 4A-4F are able to provide enhanced user interface functionality and enhanced security by delaying the displaying of sender identification information of a communication event until it is deduced that a user holds his apparatus in his hand. Additional security may be provided by additionally recognizing the user prior to displaying the sender identification information.

Figure 5A:
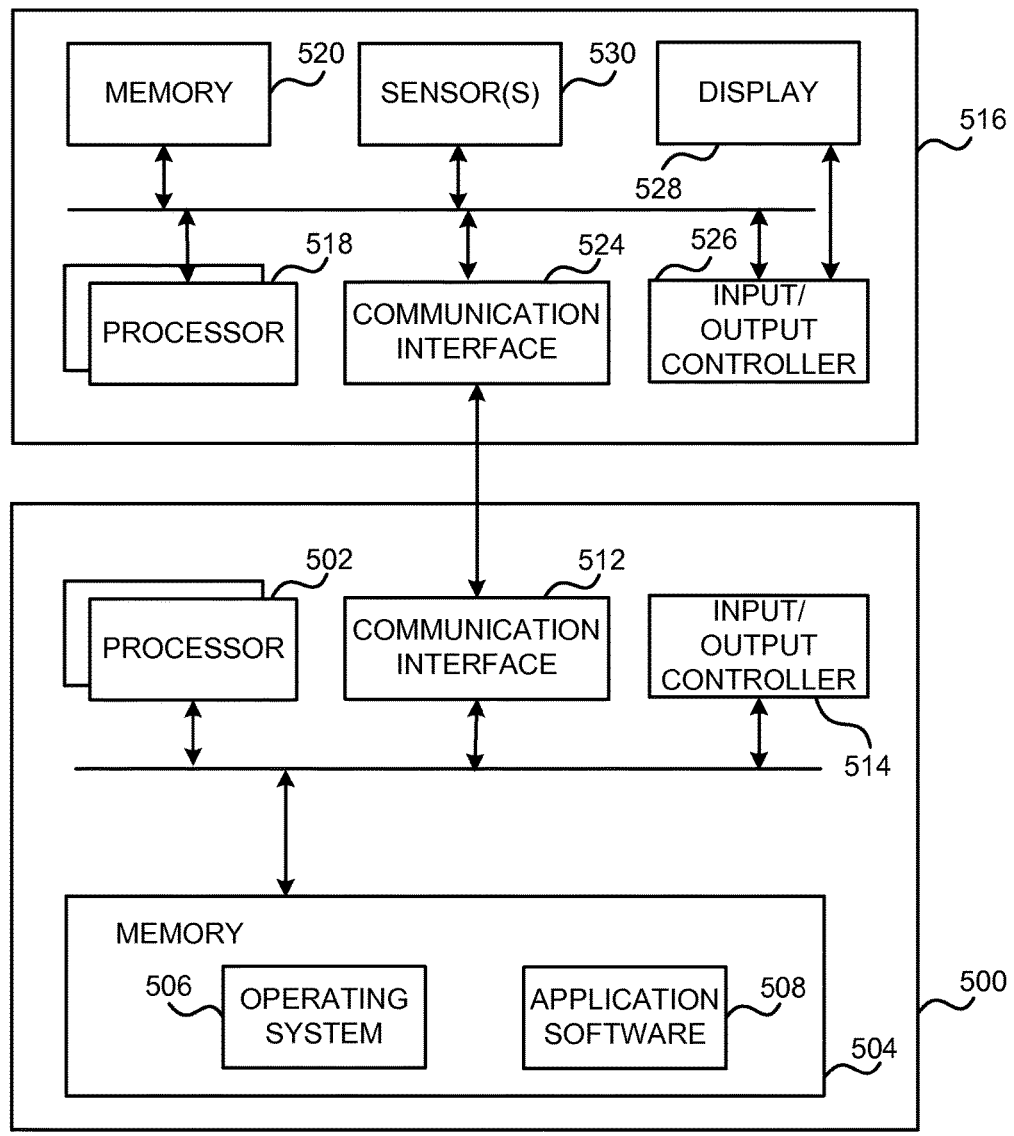
FIG. 5A is a block diagram of one example of a computing-based apparatus and an external display apparatus.

FIG. 5A is a block diagram of one example of a system comprising a computing-based apparatus 500 and an external display apparatus 516.

The computing-based apparatus 500 comprises one or more processors 502 which may be microprocessors, controllers or any other suitable type of processors for processing computer executable instructions to control the operation of the computing-based apparatus 500. Platform software comprising an operating system 506 or any other suitable platform software may be provided at the computing-based apparatus 500 to enable application software 508 to be executed on the device.

Computer executable instructions may be provided using any computer-readable media that is accessible by the computing-based apparatus 500. Computer-readable media may include, for example, computer storage media such as memory 504 and communications media. Computer storage media, such as memory 504, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 504) is shown within the computing-based apparatus 500 it will be appreciated that the storage may be distributed or located remotely and accessed via a network or other communication link (e.g. using communication interface 512).

The computing-based apparatus 500 may comprise an input/output controller 514 arranged to output display information to a display device which may be separate from or integral to the computing-based apparatus 500. The input/output controller 514 may also be arranged to receive and process input from one or more devices, such as a user input device (e.g. a keyboard, camera, microphone or other sensor). The input/output controller 514 may also output data to devices other than the display device, for example, a locally connected printing device.

The input/output controller 514 may be in communication with one or more sensors such as one or more cameras, an inertial measurement unit and/or other sensors. This enables the computing-based apparatus 500 to receive data observed by the sensors and to control the sensors.

The input/output controller 514, a display device (not shown in FIG. 5A) and optionally user input device may comprise natural user interaction (NUI) technology which enables a user to interact with the computing-based apparatus in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

The computing-based apparatus 500 may be connected to the external display apparatus 516 via the communication interfaces 512, 524. The communication interfaces 512, 524 may be wireless communication interfaces, for example, Bluetooth interfaces or any other local wireless communication interfaces, or wired communication interfaces.

Similarly to the computing-based apparatus 500, the external display apparatus 516 may comprise one or more processors 518 which may be microprocessors, controllers or any other suitable type of processors for processing computer executable instructions to control the operation of the external display apparatus 516. Computer executable instructions may be provided using any computer-readable media that is accessible by the external display apparatus 516. Computer-readable media may include, for example, computer storage media such as memory 520 and communications media. Computer storage media, such as memory 520, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although not disclosed in FIG. 5A, the memory 520 may comprise an operating system of the display device 516. The operating system may be different or the same as the operating system 506 of the computing-based apparatus 500.

The external display apparatus 516 may also comprise an input/output controller 526 arranged to output display information to a display device 528. The external display apparatus 516 may also comprise at least one sensor 530. The at least one sensor 530 may refer to any sensor arranged in the external display apparatus 516 that is able to detect touch or vicinity of a user. The at least one sensor 530 may refer, for example, to a pressure sensor, a proximity sensor, a touch sensor of a touch sensitive display, a camera etc.

The communication interface 512 may be used to receive a communication event, thus serving as means for receiving a communication event. The communication event may be, for example, an incoming call or an incoming message. The processor 502 may cause output of a temporary indication of the communication event via the communication interfaces 512, 524 on the display 528 of the external display apparatus 516, the temporary indication being provided instead of sender identification information relating to the communication event, the processor 502 thus serving as means for outputting a temporary indication of the communication event. The processor 518 and/or the display 528 thus serve as means for outputting the temporary indication of a communication event.

As disclosed above with reference to FIGS. 2A-2E and 3, the temporary indication may refer also to other indications, for example, to a visual indication (for example, a color on the display or a light provided by the mobile apparatus), an audible indication (for example, a sound), a haptic indication, and other user-perceivable indications. Thus, the computing-based apparatus 500 may include also other output devices, for example, a lamp or a led, a speaker, or an actuator etc. Further, the temporary indication may be user or group specific.

The at least one sensor 530 detects a touch on the external display apparatus 516 or vicinity of the user, thus serving as means for detecting a touch on the display or vicinity of the user, and the processor 518 causes transmission of a message indicative of touch or vicinity of the user to the computing-based apparatus 500, the processor 518 serving as means for transmitting a message indicative of touch or vicinity of the user to the apparatus 500. The touch may refer to a touch on a touch sensitive display or to a touch on other parts of the external display apparatus 516 sensed by the at least one sensor 530.

The processor 502 receives the message indicative of touch or vicinity of the user via the communication interface 512. The processor 502 may then cause display of the sender identification information on the display 528 replacing the temporary indication via the communication interface 512, the processor 502 thus serving as means for causing display of the sender identification information. The processor 518 and/or the communication interface 524 serve as means for receiving the sender identification information from the apparatus 500. The processor 518 also serves as means for causing display of the sender identification information replacing the temporary indication.

Figure 5B:
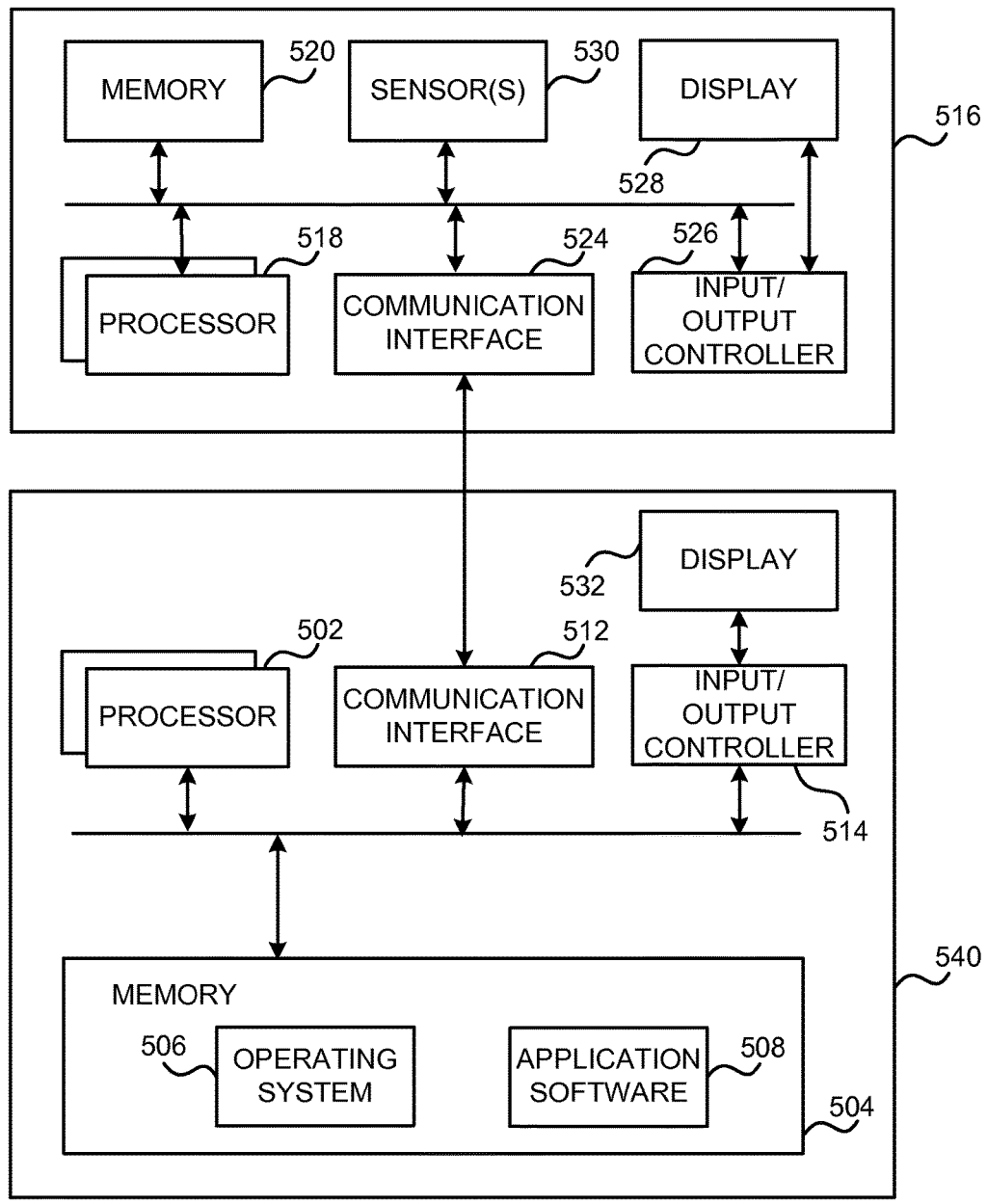
FIG. 5B is a block diagram of one example of a computing-based apparatus and an external display apparatus.

FIG. 5B is a block diagram of one example of a system comprising a computing-based apparatus 540 and an external display apparatus 516. The computing-based apparatus 540 of FIG. 5B is identical with the computing-based apparatus 500 of FIG. 5A with the exception that also the computing-based apparatus 540 comprises a display 532. The displays 532 and 528 may be configured to display similar content relating to a received communication event. For example, when the computing-based apparatus 540 is a mobile phone and it receives a call, both the display 532 and the display 528 may be arranged to display a temporary indication of the call simultaneously. Alternatively, the temporary indication may be provided only by the computing-based apparatus 540 or the external display apparatus 516. Whether to output the temporary indication with only one apparatus or both apparatuses may depend on context of the apparatuses. For example, if a smartwatch is around a wrist, but a mobile apparatus is upside down on a table or in another room, then the temporary indication may be shown by the smartwatch only. In another example, this may be user configurable. In another example, even if the temporary indication is shown in one device only, seeing the sender identification information by gripping the other device may also be possible. For example, if a user sees/feels the incoming call with his/her smartwatch and the user's mobile phone is in another room, the user could still walk into that other room, pick up the phone and check who is calling to decide if he/she will answer to that call anyway using the mobile phone.

In one example of FIG. 5A or 5B, the computing-based apparatus 500 or 540 is a mobile apparatus or a mobile phone and the external display apparatus 516 is a smartwatch. When the mobile phone receives, for example, a call, the display of the smartwatch may also be used to provide indication of the received call. When a user touches, for example, the sides of the smartwatch with his fingers, the smartwatch sends a message to the mobile phone indicative of the touch. Then the mobile phone is able to cause display of the sender identification information replacing the temporary indication on the display of the smartwatch after detecting the touch.

In one example of FIG. 5A or 5B, the computing-based apparatus 500 or 540 is a mobile apparatus or a mobile phone and the external display apparatus 516 is a wearable piece of clothing comprising a display and at least some other elements illustrated in FIG. 5A or 5B. When the mobile phone receives, for example, a call, the display in the clothing is also used to provide indication of the received call. When a user touches, for example, the display in the clothing with his finger, a processor in the clothing sends a message to the mobile phone indicative of the touch. Then the mobile phone is able to cause display of the sender identification information replacing the temporary indication on the display in the clothing after detecting the touch.

In one example of FIG. 5A or 5B, the external display device 516 may handle the logic of outputting a temporary indication of a communication event. In other words, the computing-based apparatus 500 or 540 may be configured to send the sender identification information to the external display device 516. When the at least one sensor 530 of the external display device 516 detects grip, touch or vicinity of a user, the external display device 516 causes display of the sender identification information on the display 528.

The various examples above show several implementations for detecting a user, vicinity of the user or touch or the user gripping or touching a mobile apparatus. It is clear that any combination of the disclosed implementations may be used to increase the reliability of the determination that the user has been detected.

An embodiment of a mobile apparatus comprises a display, at least one sensor; at least one processor, and at least one memory storing program instructions that, when executed by the at least one processor, cause the mobile apparatus to: receive a communication event; cause output of a temporary indication of the communication event instead of providing sender identification information relating to the communication event on the display; detect a user of the mobile apparatus with the at least one sensor; and cause display of the sender identification information on the display replacing the temporary indication in response to detecting the user with the at least one sensor. In an embodiment the at least one memory store program instructions that, when executed, cause the mobile apparatus to detect, with the at least one sensor device, that the mobile apparatus is held in a hand, and to cause display of the sender identification information on the display replacing the temporary indication in response to detecting that the mobile apparatus is held in a hand with the at least one sensor.

In an embodiment, alternatively or in addition, the at least one memory store program instructions that, when executed, cause the mobile apparatus to delay causing display of the sender identification information on the display by a predetermined period after detecting that the mobile apparatus is held in a hand.

In an embodiment, alternatively or in addition, the at least one memory store program instructions that, when executed, cause the mobile apparatus to cause display of the sender identification information on the display after detecting that the mobile apparatus is held in a hand in at least one predetermined position on the mobile apparatus.

In an embodiment, alternatively or in addition, the at least one memory store program instructions that, when executed, cause the mobile apparatus to cause display of the sender identification information on the display after detecting that a predetermined pressure level is exceeded when the mobile apparatus is held in a hand.

In an embodiment, alternatively or in addition, the at least one sensor comprises an acceleration sensor, wherein the at least one memory store program instructions that, when executed, cause the mobile apparatus to determine based on information from the acceleration sensor that the user of the mobile apparatus has stabilized the mobile apparatus, and to cause display of the sender identification information on the display replacing the temporary indication.

In an embodiment, alternatively or in addition, the at least one sensor comprises a gyroscope, wherein the at least one memory store program instructions that, when executed, cause the mobile apparatus to determine based on information from the gyroscope that the user of the mobile apparatus has stabilized the mobile apparatus; and to cause display of the sender identification information on the display replacing the temporary indication after stabilization.

In an embodiment, alternatively or in addition, the at least one sensor comprises at least one camera, wherein the at least one memory store program instructions that, when executed, cause the mobile apparatus to: activate the at least one camera; analyze image information from the at least one camera; and cause display of the sender identification information on the display after recognizing a predetermined user in response to the analysis.

In an embodiment, alternatively or in addition, the at least one sensor comprises at least one camera, wherein the at least one memory store program instructions that, when executed, cause the mobile apparatus to: activate the at least one camera; analyze image information from the at least one camera; and cause display of the sender identification information on the display after recognizing, based on image information provided by the at least one camera, that a distance from the mobile apparatus to the face of the user is less than a predetermined threshold value.

In an embodiment, alternatively or in addition, the display is a touch sensitive display and the at least one sensor is arranged in the touch sensitive display, and wherein the at least one memory store program instructions that, when executed, cause the mobile apparatus to detect that the mobile apparatus is held in a hand with the touch sensitive display of the mobile apparatus.

In an embodiment, alternatively or in addition, wherein the at least one sensor arranged in at least one side of the mobile apparatus.

In an embodiment, alternatively or in addition, the at least one memory store program instructions that, when executed, cause the mobile apparatus to detect, with the at least one sensor, that the mobile apparatus is held in a hand in at least one predetermined position on the mobile apparatus, to sense a pressure level in the at least one predetermined position, and to cause display of the sender identification information on the display after detecting a predetermined pressure level is exceeded in the at least one predetermined position when the mobile apparatus is held in a hand.

In an embodiment, alternatively or in addition, the mobile apparatus comprises a proximity sensor, wherein the at least one memory store program instructions that, when executed, cause the mobile apparatus to determine distance of the mobile apparatus to the user of the mobile apparatus based on information from the proximity sensor, and to cause display of the sender identification information on the display replacing the temporary indication when the distance is less than a threshold value.

In an embodiment, alternatively or in addition, the communication event is a call or a message.

In an embodiment, alternatively or in addition, the at least one memory store program instructions that, when executed, cause the mobile apparatus to: detect, with the at least one sensor, vicinity of a hand of the user to the mobile apparatus; and cause display of the sender identification information on the display replacing the temporary indication when detecting vicinity of the hand of the user to the mobile apparatus.

In an embodiment, alternatively or in addition, the temporary indication comprises at least one of: a visual indication, an audible indication, a haptic indication, and other user-perceivable indication. The indication may thus be, for example, a sound or sound pattern, a light or light pattern, or a graphical indication on the display (for example, a group indication, a textual or color indication). The temporary indication may be user or group specific.

An embodiment of an apparatus comprises at least one processor, at least one memory storing program instructions, a communication interface for enabling communication with a display apparatus, the at least one memory storing program instructions that, when executed, cause the apparatus to receive a communication event, to cause output of a temporary indication of the communication event with the display apparatus instead of providing sender identification information relating to the communication event, to receive a message indicative of detection of a user with at least one sensor of the display apparatus, and to cause display of the sender identification information with the display apparatus replacing the temporary indication after detecting the user with the at least one sensor.

An embodiment of a system comprises an apparatus comprising at least one processor, at least one memory storing program instructions, and a communication interface for enabling communication with a display apparatus; a display apparatus comprising at least one processor, at least one memory storing program instructions, a communication interface for enabling communication with the apparatus, and a display, wherein the at least one memory of the apparatus storing program instructions that, when executed, cause the apparatus to receive a communication event, to cause output of a temporary indication of the communication event with the display apparatus instead of providing sender identification information relating to the communication event, to receive a message indicative detection of a user with at least one sensor of the display apparatus, to cause display of the sender identification information with the display apparatus replacing the temporary indication after detecting the user with the at least one sensor; and wherein the at least one memory of the display apparatus storing program instructions that, when executed, cause the display apparatus to cause output of the temporary indication of a communication even instead of sender identification information relating to the communication event, to detect a touch on the display apparatus or vicinity of the user, to cause transmission of a message indicative of touch or vicinity of the user to the apparatus, to receive the sender identification information from the apparatus in response to the message indicative of touch or vicinity of the user, and to cause display of the sender identification information on the display replacing the temporary indication.

In an embodiment the apparatus is a mobile phone and the display apparatus is a smartwatch.

An embodiment of a method comprises receiving a communication event with a mobile apparatus; causing output of a temporary indication of the communication event instead of providing sender identification information relating to the communication event on a display of the mobile apparatus, detecting a user of the mobile apparatus with at least one sensor of the mobile apparatus; and causing display of the sender identification information on the display replacing the temporary indication in response to detecting the user with the at least one sensor.

In an embodiment, alternatively or in addition, the method comprises detecting, with the at least one sensor device, that the mobile apparatus is held in a hand, and causing display of the sender identification information on the display replacing the temporary indication in response to detecting that the mobile apparatus is held in a hand with the at least one sensor.

In an embodiment, alternatively or in addition, the method comprises delaying causing display of the sender identification information on the display by a predetermined period after detecting that the mobile apparatus is held in a hand.

In an embodiment, alternatively or in addition, the method comprises causing display of the sender identification information on the display after detecting that the mobile apparatus is held in a hand in at least one predetermined position on the mobile apparatus.

In an embodiment, alternatively or in addition, the method comprises causing display of the sender identification information on the display after detecting that a predetermined pressure level is exceeded when the mobile apparatus is held in a hand.

In an embodiment, alternatively or in addition, the method comprises determining based on information from an acceleration sensor or gyroscope that the user of the mobile device has stabilized the mobile apparatus, and causing display of the sender identification information on the display replacing the temporary indication after stabilization.

In an embodiment, alternatively or in addition, the method comprises: activating the at least one camera; analyzing image information from the at least one camera; and causing display of the sender identification information on the display after recognizing a predetermined user in response to the analysis.

In an embodiment, alternatively or in addition, the method comprises: activating the at least one camera; analyzing image information from the at least one camera; and causing display of the sender identification information on the display after recognizing, based on image information provided by the at least one camera, that a distance from the mobile apparatus to the face of the user is less than a predetermined threshold value.

In an embodiment, alternatively or in addition, the method comprises detecting that the mobile apparatus is held in a hand with a touch sensitive display of the mobile apparatus.

In an embodiment, alternatively or in addition, the method comprises detecting that the mobile apparatus is held in a hand with at least one sensor arranged in at least one side of the mobile apparatus.

In an embodiment the method comprises detecting, with the at least one sensor, that the mobile apparatus is held in a hand in at least one predetermined position on the mobile apparatus, sensing a pressure level in the at least one predetermined position; and causing display of the sender identification information on the display after detecting that a predetermined pressure level is exceeded in the at least one predetermined position when the mobile apparatus is held in a hand.

In an embodiment, alternatively or in addition, the communication event is a call or a message.

In an embodiment, alternatively or in addition, the method comprises: detect, with the at least one sensor, vicinity of a hand of the user to the mobile apparatus; and causing display of the sender identification information on the display replacing the temporary indication when detecting vicinity of the hand of the user to the mobile apparatus.

In an embodiment, alternatively or in addition, the temporary indication comprises at least one of: a visual indication, an audible indication, a haptic indication, and other user-perceivable indication. The indication may thus be, for example, a sound or sound pattern, a light or light pattern, or a graphical indication on the display (for example, a group indication, a textual or color indication). The temporary indication may be user or group specific.

An embodiment of a mobile apparatus comprises a display, at least one sensor, means for receiving a communication event, means for outputting a temporary indication of the communication event instead of providing sender identification information relating to the communication event on the display, means for detecting a user of the mobile apparatus with the at least one sensor, and means for causing display of the sender identification information on the display replacing the temporary indication in response to detecting the user with the at least one sensor.

An embodiment of an apparatus comprises a communication interface for enabling communication with a display apparatus, means for receiving a communication event, means for outputting a temporary indication of the communication event instead of providing sender identification information relating to the communication event, means for receiving a message indicative of detection of a user with at least one sensor of the display apparatus, and means for causing display of the sender identification information with the display apparatus replacing the temporary indication after detecting the user with the at least one sensor.

An embodiment of a system comprises an apparatus comprising a communication interface for enabling communication with a display apparatus and a display apparatus comprising a communication interface for enabling communication with the apparatus and a display. The apparatus comprises means for receiving a communication event, means for outputting a temporary indication of the communication event with the display apparatus instead of providing sender identification information relating to the communication event, means for receiving a message indicative of detection of a user with at least one sensor of the display apparatus, means for causing display of the sender identification information with the display apparatus replacing the temporary indication after detecting the user with the at least one sensor. The display apparatus comprises means for outputting the temporary indication of a communication event instead of providing sender identification information relating to the communication event, means for detecting a touch on the display or vicinity of the user, means for causing transmission of a message indicative of touch or vicinity of the user to the apparatus, means for receiving the sender identification information from the apparatus in response to the message indicative of touch or vicinity of the user, and means for causing display of the sender identification information on the display replacing the temporary indication.

In one embodiment, the apparatus may comprise means for detecting that the mobile apparatus is held in a hand, and means for causing display of the sender identification information on the display replacing the temporary indication in response to detecting that the mobile apparatus is held in a hand with the at least one sensor.

In one embodiment, alternatively or in addition, the apparatus may comprise means for delaying display of the sender identification information on the display by a predetermined period after detecting that the mobile apparatus is held in a hand.

In one embodiment, alternatively or in addition, the apparatus may comprise means for causing display of the sender identification information on the display after detecting that the mobile apparatus is held in a hand in at least one predetermined position on the mobile apparatus.

In one embodiment, alternatively or in addition, the apparatus may comprise means for causing display of the sender identification information on the display after detecting that a predetermined pressure level is exceeded when the mobile apparatus is held in a hand.

In one embodiment, alternatively or in addition, the at least one sensor comprises an acceleration sensor, and the apparatus comprises means for determining based on information from the acceleration sensor that the user of the mobile apparatus has stabilized the mobile apparatus, and means for causing display of the sender identification information on the display replacing the temporary indication after stabilization.

In one embodiment, alternatively or in addition, the at least one sensor comprises at least one camera, and the apparatus comprises means for activating the at least one camera; means for analyzing image information from the at least one camera, and means for causing display of the sender identification information on the display after recognizing a predetermined user in response to the analysis.

In one embodiment, alternatively or in addition, the at least one sensor comprises at least one camera, and the apparatus comprises means for activating the at least one camera; means for analyzing image information from the at least one camera; and means for causing display of the sender identification information on the display after recognizing, based on image information provided by the at least one camera, that a distance from the mobile apparatus to the face of the user is less than a predetermined threshold value.

In one embodiment, alternatively or in addition, the at least one sensor comprises a gyroscope, and the apparatus comprises means for determining based on information from the gyroscope that the user of the mobile apparatus has stabilized the mobile apparatus; and means for causing display of the sender identification information on the display replacing the temporary indication after stabilization.

In one embodiment, alternatively or in addition, the display is a touch-sensitive display, and the apparatus comprises means for detecting that the mobile apparatus is held in a hand with the touch sensitive display of the mobile apparatus.

In one embodiment, alternatively or in addition, the at least one sensor is arranged in at least one side of the mobile apparatus.

In one embodiment, alternatively or in addition, the apparatus comprises means for detecting, with the at least one sensor, that the mobile apparatus is held in a hand in at least one predetermined position on the mobile apparatus; means for sensing a pressure level in the at least one predetermined position; and means for causing display of the sender identification information on the display after detecting that a predetermined pressure level is exceeded when the mobile apparatus is held in a hand in the at least one predetermined position.

In one embodiment, alternatively or in addition, the communication event is a call or a message.

In one embodiment, alternatively or in addition, the apparatus comprises means for detecting, with the at least one sensor, vicinity of a hand of the user to the mobile apparatus; and means for causing display of the sender identification information on the display replacing the temporary indication when detecting vicinity of the hand of the user to the mobile apparatus.

In one embodiment, alternatively or in addition, the temporary indication comprises at least one of: a visual indication, an audible indication, a haptic indication, and other user-perceivable indication. The indication may thus be, for example, a sound or sound pattern, a light or light pattern, or a graphical indication on the display (for example, a group indication, a textual or color indication). The temporary indication may be user or group specific.

In one embodiment, there is provided a computer program or a computer program product comprising program code instructions, which when executed by a processing unit, perform the following: receiving a communication event with a mobile apparatus; causing output of a temporary indication of the communication even instead of providing sender identification information relating to the communication event on a display; detecting a user of the mobile apparatus with at least one sensor of the mobile apparatus; and causing display of the sender identification information on the display replacing the temporary indication in response to detecting the user with the at least one sensor.

In one embodiment, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer', 'computing-based device', 'apparatus' and 'mobile apparatus' each may include PCs, servers, mobile telephones (including smart phones), tablet computers, set-top boxes, media players, games consoles, personal digital assistants and many other devices. These devices may also comprise communication capabilities for providing access to at least one cellular and/or data communication networks including, for example, wireless communications networks, wireless local area networks (WLAN), cellular communications networks, 3G communications networks, 4G communications networks, Long-Term Evolution (LTE) networks, Packet Data Networks (PDNs), the Internet, intranets, a combination thereof, and the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A mobile apparatus comprising:
   a display;
   at least one sensor;
   at least one processor, and
   at least one memory storing program instructions that, when executed by the at least one processor, cause the mobile apparatus to:
      receive a communication event;
      cause output of a temporary indication of the communication event instead of providing sender identification information relating to the communication event on the display;
      detect, with the at least one sensor, that the mobile apparatus is held in a hand;
      upon detecting that the mobile apparatus is held in the hand, detect that the mobile apparatus is held at a predetermined angle; and
      cause display of the sender identification information on the display to replace the temporary indication in response to detecting that the mobile apparatus is held in the hand and at the predetermined angle.

2. The mobile apparatus according to claim 1, wherein the at least one memory store program instructions that, when executed, cause the mobile apparatus to:
   delay causing display of the sender identification information on the display by a predetermined period after detecting that the mobile apparatus is held in the hand.

3. The mobile apparatus according to claim 1, wherein causing display of the sender identification information on the display to replace the temporary indication in response to detecting that the mobile apparatus is held in a hand with the at least one sensor further comprises causing display of the sender identification information on the display after detecting that the mobile apparatus is held in the hand at the predetermined angle.

4. The mobile apparatus according to claim 1, wherein causing display of the sender identification information on the display to replace the temporary indication in response to detecting that the mobile apparatus is held in a hand with the at least one sensor further comprises causing display of the sender identification information on the display after detecting that a predetermined pressure level is exceeded when the mobile apparatus is held in the hand.

5. The mobile apparatus according to claim 1, wherein the at least one sensor comprises an acceleration sensor, wherein the at least one memory store program instructions that, when executed, cause the mobile apparatus to:
  determine based on information from the acceleration sensor that the user of the mobile apparatus has stabilized the mobile apparatus; and
  wherein causing display of the sender identification information on the display to replace the temporary indication in response to detecting that the mobile apparatus is held in a hand with the at least one sensor further comprises causing display of the sender identification information on the display to replace the temporary indication upon detecting that the mobile apparatus is held in the hand and after stabilization.

6. The mobile apparatus according to claim 1, wherein the at least one sensor comprises at least one camera, wherein the at least one memory store program instructions that, when executed, cause the mobile apparatus to:
  activate the at least one camera;
  analyze image information from the at least one camera; and
  wherein causing display of the sender identification information on the display to replace the temporary indication in response to detecting that the mobile apparatus is held in a hand with the at least one sensor further comprises causing display of the sender identification information on the display after recognizing a predetermined user in response to the analysis.

7. The mobile apparatus according to claim 1, wherein the at least one sensor comprises at least one camera, wherein the at least one memory store program instructions that, when executed, cause the mobile apparatus to:
  activate the at least one camera;
  analyze image information from the at least one camera; and
  wherein causing display of the sender identification information on the display to replace the temporary indication in response to detecting that the mobile apparatus is held in a hand with the at least one sensor further comprises causing display of the sender identification information on the display after recognizing that the mobile apparatus is held in the hand and, based on image information provided by the at least one camera, that a distance from the mobile apparatus to the face of the user is less than a predetermined threshold value.

8. The mobile apparatus according to claim 1, wherein the at least one sensor comprises a gyroscope, wherein the at least one memory store program instructions that, when executed, cause the mobile apparatus to:
  determine based on information from the gyroscope that the user of the mobile apparatus has stabilized the mobile apparatus; and
  wherein causing display of the sender identification information on the display to replace the temporary indication in response to detecting that the mobile apparatus is held in a hand with the at least one sensor further comprises causing display of the sender identification information on the display to replace the temporary indication upon detecting that the mobile apparatus is held in the hand and after stabilization.

9. The mobile apparatus according to claim 1, wherein detecting that the mobile apparatus is held in a hand comprises detecting that the mobile apparatus is held in the hand with the touch sensitive display of the mobile apparatus.

10. The mobile apparatus according to claim 1, wherein the at least one sensor is arranged in at least one side of the mobile apparatus.

11. The mobile apparatus according to claim 1,
  wherein detecting that the mobile apparatus is held in a hand further comprises:
    sensing a pressure level while the mobile apparatus is held at the predetermined angle; and
  wherein causing display of the sender identification information on the display to replace the temporary indication in response to detecting that the mobile apparatus is held in a hand with the at least one sensor further comprises causing display of the sender identification information on the display after detecting that the predetermined pressure level is exceeded when the mobile apparatus is held in the hand at the predetermined angle.

12. The mobile apparatus according to claim 1, wherein the communication event is a call or a message.

13. The mobile apparatus according to claim 1, wherein detecting that the mobile apparatus is held in a hand further comprises detecting, with the at least one sensor, vicinity of the hand of the user to the mobile apparatus; and
  wherein causing display of the sender identification information on the display to replace the temporary indication in response to detecting that the mobile apparatus is held in a hand with the at least one sensor further comprises causing display of the sender identification information on the display to replace the temporary indication when detecting vicinity of the hand of the user to the mobile apparatus.

14. The mobile apparatus according to claim 1, wherein the temporary indication comprises one or more of the following:
  a visual indication;
  an audible indication;
  a haptic indication; and
  other user-perceivable indication.

15. The mobile apparatus according to claim 1, wherein the at least one sensor comprises at least one camera, wherein the at least one memory store program instructions that, when executed, cause the mobile apparatus to:
  activate the at least one camera;
  analyze an image of a user from the at least one camera;
  determine an identity of the user based on the analyzed image; and
  wherein causing display of the sender identification information on the display to replace the temporary indication in response to detecting that the mobile apparatus is held in a hand with the at least one sensor further comprises causing display of the sender identification information on the display after recognizing that the mobile apparatus is held in the hand and based on the determined identify of the user.

16. An apparatus comprising:
  at least one processor;
  at least one memory storing program instructions;
  a communication interface enabling communication with a display apparatus;
  the at least one memory storing program instructions that, when executed, cause the apparatus to:
    receive a communication event;
    cause output of a temporary indication of the communication event with the display apparatus instead of providing sender identification information relating to the communication event;

receive a message indicative of detection, with at least one sensor of the display apparatus, that the apparatus is held in a hand;

upon detecting that the mobile apparatus is held in the hand, detect that the mobile apparatus is held at a predetermined angle; and cause display of the sender identification information with the display apparatus to replace the temporary indication after detecting that the apparatus is held in the hand and at the predetermined angle with the at least one sensor.

17. The apparatus according to claim 16, wherein the apparatus is a mobile phone and the display apparatus is a smartwatch.

18. A method comprising:

receiving a communication event with a mobile apparatus;

causing output of a temporary indication of the communication even instead of providing sender identification information relating to the communication event on a display of the mobile apparatus;

detecting, with at least one sensor of the mobile apparatus, that the mobile apparatus is held in a hand;

upon detecting that the mobile apparatus is held in the hand, detecting that the mobile apparatus is held at a predetermined angle; and causing display of the sender identification information on the display to replace the temporary indication in response to detecting that the mobile apparatus is held in the hand and at the predetermined angle.

19. The method according to claim 18, wherein the temporary indication comprises one or more of the following:

a visual indication;

an audible indication;

a haptic indication; and other user-perceivable indication.

20. The method according to claim 18, further comprising:

capturing an image of a user from a camera on the mobile apparatus;

determine an identity of the user based on the image; and wherein causing display of the sender identification information on the display to replace the temporary indication in response to detecting that the mobile apparatus is held in the hand further comprises causing display of the sender identification information on the display after recognizing that the mobile apparatus is held in the hand and based on the determined identify of the user.

* * * * *